(No Model.)
BEST AVAILABLE COPY
B. HEYWOOD.
COMMUTATOR FOR DYNAMO ELECTRIC MACHINES AND ELECTRIC MOTORS.
No. 399,329.   Patented Mar. 12, 1889.
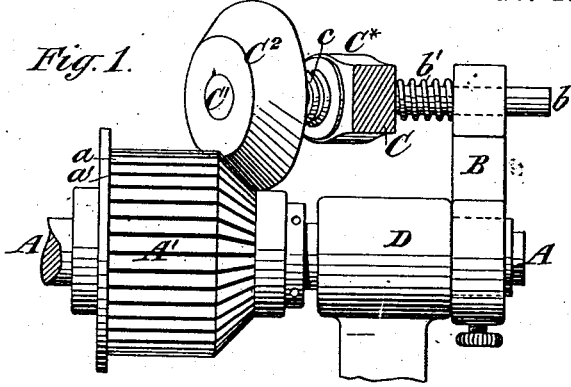
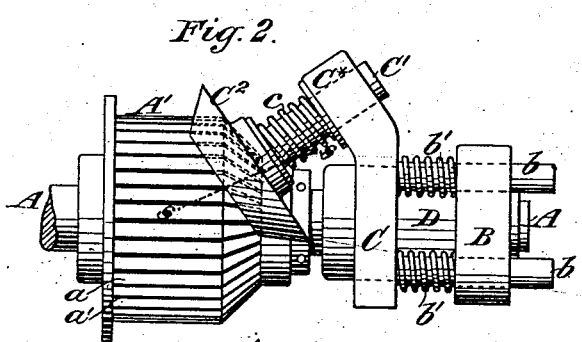
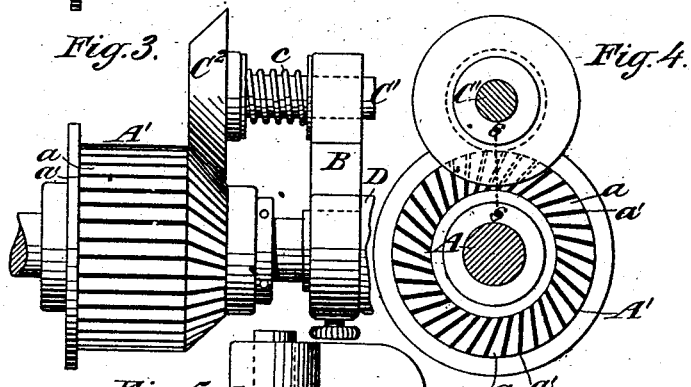
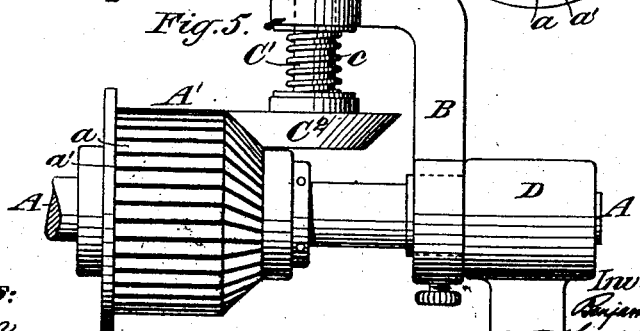

UNITED STATES PATENT OFFICE.

BENJAMIN HEYWOOD, OF NEW YORK, N. Y.

COMMUTATOR FOR DYNAMO-ELECTRIC MACHINES AND ELECTRIC MOTORS.

SPECIFICATION forming part of Letters Patent No. 399,329, dated March 12, 1889.

Application filed May 11, 1888. Serial No. 273,554. (No model.)

*To all whom it may concern:*

Be it known that I, BENJAMIN HEYWOOD, a citizen of the United States, residing in the city, county, and State of New York, have invented a new and useful Improvement in Dynamos and Electric Motors, of which the following is a full, clear, and exact description, taken in connection with the accompanying drawings.

This invention relates to rotary brushes which are caused to rotate in contact with the rotary commutators of dynamos and electric motors by the rotary motion of the latter and the friction of contact.

The principal object of the invention is to cause such a brush to make contact with one of the metal bars of the commutator before it ceases to be in contact with the next of the said bars, and thereby to obtain a continuous current and prevent sparking; and to this end the improvement consists in the combination of the commutator and a rotary brush having the planes of the bars of the commutator and the plane of the axis of the brush oblique to each other at the line of their contact.

The invention further consists in certain combinations, hereinafter described and claimed, of which the rotary commutator and rotary contact-brush constitute elements.

In order to enable others skilled in the art to which my invention pertains to make and use the same, I will now proceed to describe its construction and operation, referring to the accompanying drawings, which represent three different examples of my invention.

Figure 1 is a side view, partly in section, illustrating one example of my invention, showing a revolving commutator, a portion of its shaft, one of the shaft-bearings, the rotary brush and the rocker-arm which carries it; and Fig. 2 is a plan corresponding with Fig. 1. Fig. 3 is a side view, and Fig. 4 a front view, illustrating another example of my invention. Fig. 5 is a side view illustrating a third example.

Similar letters of reference designate corresponding parts in all the figures.

Referring first to Figs. 1 and 2, A designates the shaft of the dynamo or motor, having upon it the commutator A', which is formed in any usual or suitable manner of alternate conducting-bars of metal $a$, with insulating-bars $a'$ interposed between them. These conducting and insulating bars $a\ a'$ are supposed to be radial to the axis of the shaft, as is usual in such commutators. D designates one of the journal-boxes in which the shaft A rotates. Upon a prolongation of the journal-box D is pivoted the rocker-arm B, in the outer end of which is carried a pair of sliding pins, $b$, on the exterior of which are springs $b'$. Upon the end of the sliding pins $b$ is a yoke or stock, C, having on one side a bent lateral arm, C*, and in the end of this lateral arm C* is firmly secured a stud or axle, C', on the end of which turns freely the revolving brush C², which is represented as consisting of a bevel-wheel of metal having a smooth conical periphery which bears against the conical face of the commutator. The stud or axle C' in this example of my invention is oblique and tangential to the axis of the commutator, as shown best in Fig. 2, and hence a plane taken through the axis of the brush at the place of its contact with the commutator is oblique to the plane of that radial bar of the commutator which is in contact with the brush. The line $s$ of contact between the conical surfaces of the commutator and brush (represented by a strong dotted line in Fig. 2) crosses two of the bars $a\ a$ of the commutator, so that the brush always makes contact with one bar before breaking it with the next one behind it, and hence an unbroken current is obtained. The springs $b'$, before mentioned, always act on the stock C to press the rotary brush against the commutator in the direction of the axis of the latter; but I have also shown a spring, $c$, coiled around the axle C' of the brush, between the arm C and the brush, to press the latter in the direction of its own axis toward the commutator. The springs $b'$ and $c$ thus always preserve the contact between the rotary brush and commutator, notwithstanding wear.

In the example shown in Figs. 3 and 4 and in that shown in Fig. 5 the oblique relation between the planes of the bars of the commutator and the planes of the axis of the rotary brush is obtained, while the axis of the commutator and that of the brush are in the same plane by simply arranging the bars $a\ a$ of the commutator tangential to a circle surrounding its axis, as shown in Fig. 4.

In Figs. 2 and 3 the axis of the rotary brush is parallel with that of the commutator, and in Fig. 4 the axes are at right angles to each other, but in the same plane. This construction of the commutator enables me to carry the brush-shaft C' directly in the rocker-arm B without the intervention of the yoke or stock C. The effect of retaining always an electrical contact with one of the bars $a$ till the contact with the next one is fully made is fully attained by this construction of the commutator, as will be clearly noted by reference to Fig. 4, where the line $s$ of contact is indicated plainly by a strong dotted line.

Nothing has been herein said of the proper insulation of the journal-bearing, the rocker-arm, &c., as this forms no part of my invention, and is a necessary part of the construction of the machine commonly known to all electricians, and I do not deem it necessary to describe it in connection herewith.

What I claim as my invention, and desire to secure by Letters Patent, is—

1. The combination, in a dynamo or electric motor, of a rotary commutator and a rotary brush having the plane of the bars of the commutator and a plane taken through the axis of the brush at its point of contact with the commutator oblique or diagonal to each other, substantially as and for the purpose herein described.

2. In a dynamo or electric motor, the combination, with the rotary commutator, a rotary brush, and a rocker-arm for carrying said brush, of a spring for pressing the rotary brush in the direction of the line of the axis of the commutator for and into continuous contact with the commutator, substantially as and for the purpose herein set forth.

3. In a dynamo or electric motor, the combination, with the main shaft and the rotary commutator thereon, of a rocker-arm, a rotary brush carried by the rocker-arm, and a spring for pressing the said brush in the direction of its own axis into contact with the commutator, substantially as and for the purpose set forth.

BENJAMIN HEYWOOD.

Witnesses:
  FREDK. HAYNES,
  HENRY J. MCBRIDE.